May 27, 1969     S. MOSKOWITZ ET AL     3,446,970
RADIATION SENSITIVE HIGH ACCURACY HORIZON SEEKER
Filed May 15, 1963
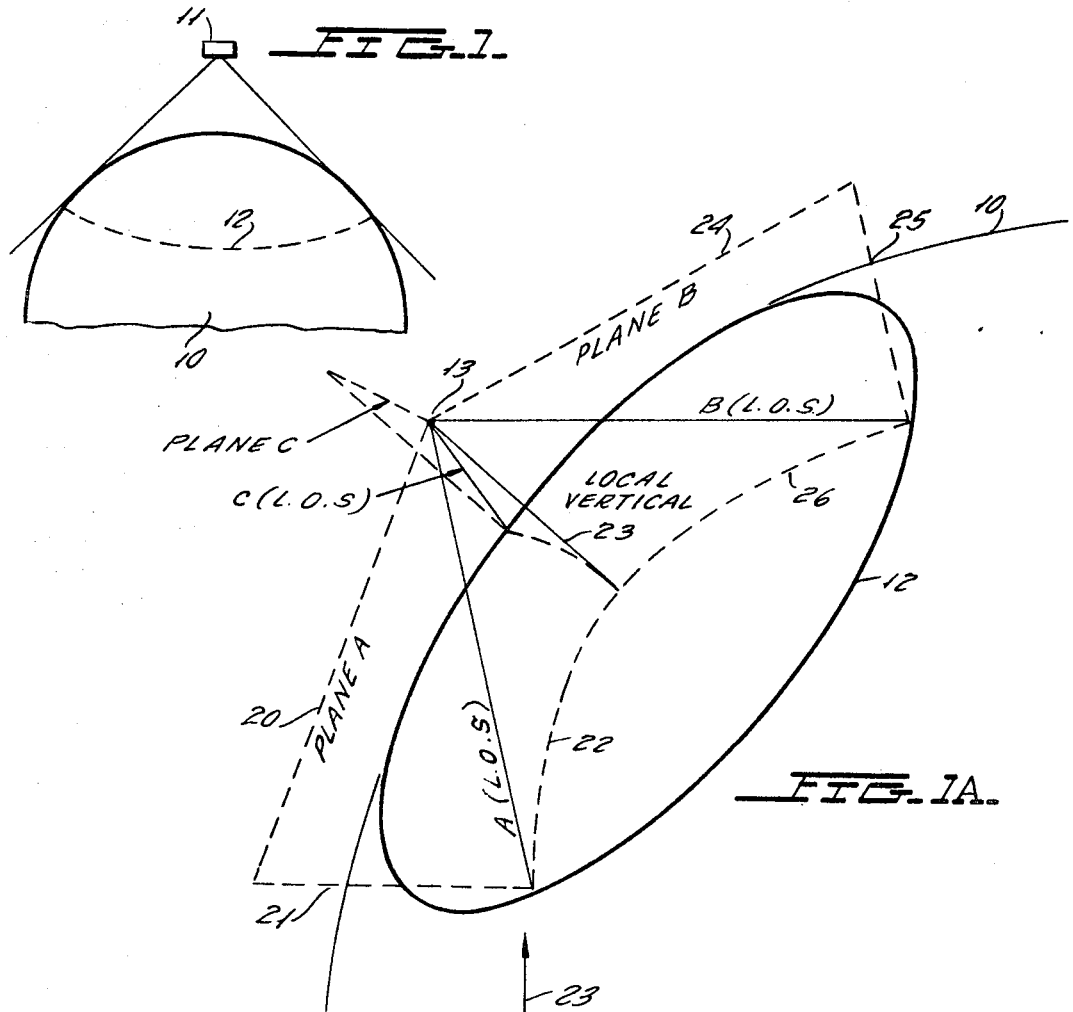
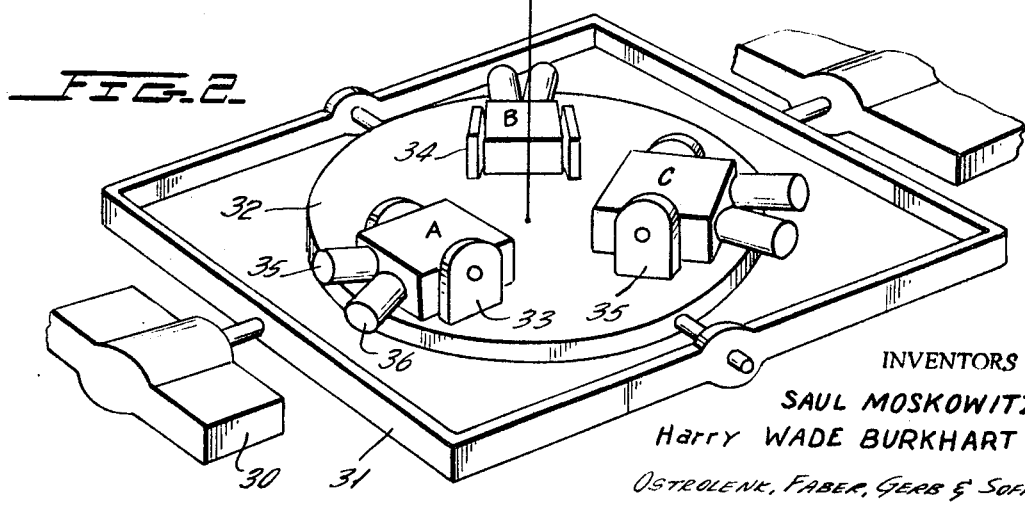
INVENTORS
SAUL MOSKOWITZ
Harry WADE BURKHART JR
OSTROLENK, FABER, GERB & SOFFEN
ATTORNEYS

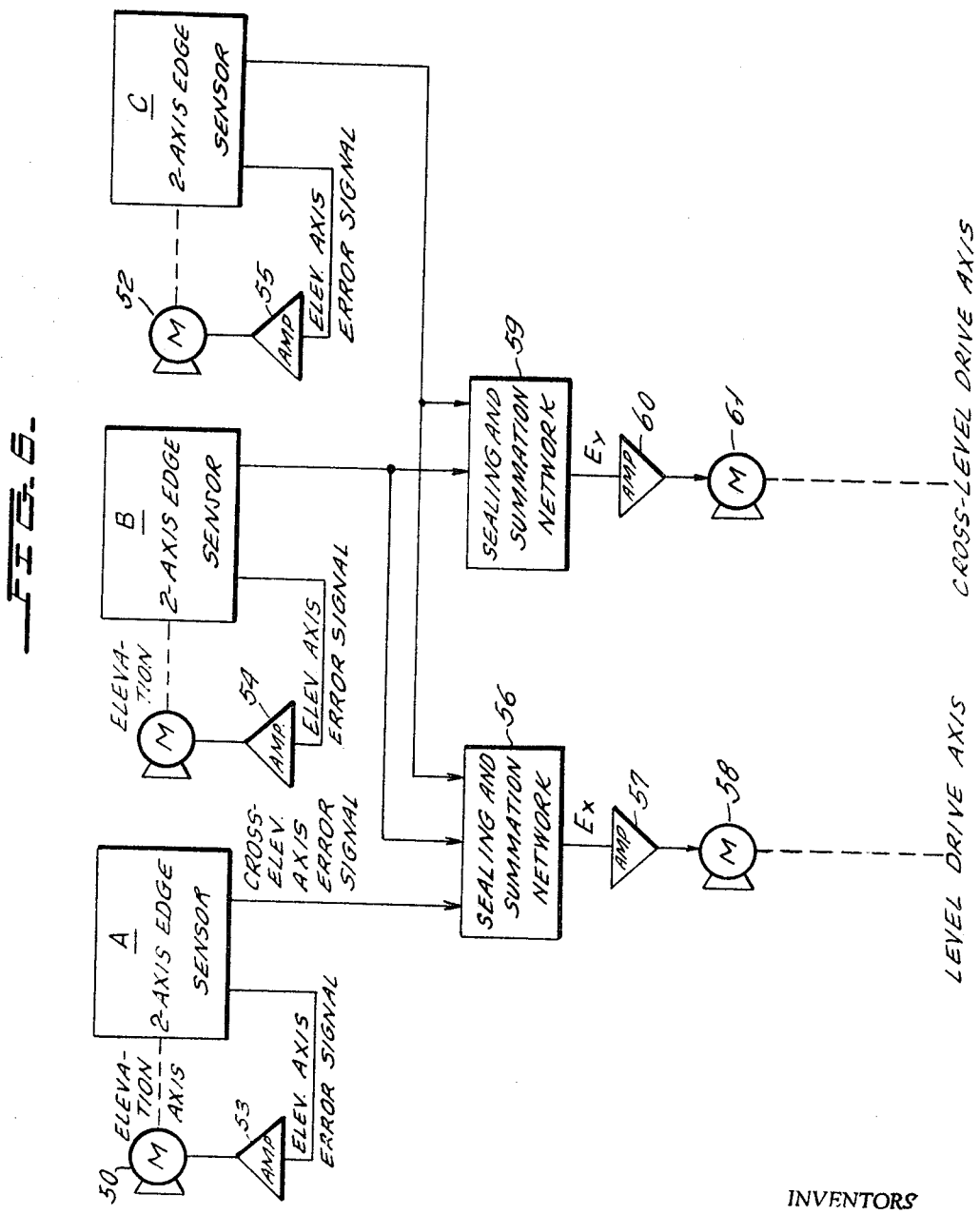

United States Patent Office 3,446,970
Patented May 27, 1969

3,446,970
RADIATION SENSITIVE HIGH ACCURACY HORIZON SEEKER
Saul Moskowitz, Flushing, and Harry Wade Burkhart, Jr., New Paltz, N.Y., assignors to Kollsman Instrument Corporation, Elmhurst, N.Y., a corporation of New York
Filed May 15, 1963, Ser. No. 280,648
Int. Cl. G06f 15/50; F42b 15/02; G01j 1/20
U.S. Cl. 250—203
9 Claims This invention relates to a horizon seeker, and more specifically relates to a novel high accuracy passive horizon seeker which can determine the local vertical.

In accordance with the invention, a means is provided for determining the local vertical to the earth, the moon or any planetary body by passive scanning of the horizon of the body. More specifically, at least two two-axis edge-sensors which may be of any standard well-known configuration are appropriately supported from the instrument and scan the horizon of the body, whereby the two devices are capable of setting up two theoretical planes which are perpendicular to the local axis of the horizon portions which they scan. The intersection of these planes then determines the local vertical, even though the observed horizons are removed from the actual horizon line.

When using this novel concept, it is unimportant that the observed horizon is somewhat removed from the actual horizon so long as the small portions of the horizons being observed are parallel to the actual horizons. That is to say, planes perpendicular to the observed horizon will also be perpendicular to the actual horizon, whereby an accurate determination of the vertical through the intersection of these planes is obtained.

If desired, the accuracy of the system may be increased by providing redundancy through the use of additional two-axis edge-sensing devices.

Accordingly, a primary object of this invention is to provide a novel high accuracy passive horizon seeker.

Another object for this invention is to provide a novel means for determining the local vertical to any planetary or celestial body which moves with respect to the body.

A still further object of this invention is to provide a novel horizon seeker whose operation is independent of the region of the electromagnetic spectrum selected for passive sensors incorporated in the system.

A further object of this invention is to provide a novel instrument vertical determining system for use with manned and unmanned aircraft, orbital vehicles and space vehicles.

A still further object of this invention is to provide a high accuracy horizon seeker which is operable even though the observed horizon line varies with respect to the true horizon line about its entire circular extent.

Another object of this invention is to provide a novel means for measuring the local vertical which has no time dependent drift characteristics.

A further object of this invention is to provide a novel means for geometrically determining the vertical local axis of a vehicle which eliminates complex electronic computation.

Yet another object of this invention is to provide a novel means for determining the local vertical axis of an instrument which is operable under conditions in which the horizon edge is poorly defined.

Another object of this invention is to provide a novel system for determining the local vertical axis of an instrument which is operable, even though the apparent horizon is not equally spaced from the true horizon along its entire extent so long as, on the average, small regions of the apparent horizon are parallel to the true horizon.

These and other objects of this invention will become apparent from the following description when taken in connection with the drawings, in which:

FIGURE 1 illustrates a side view of the horizon line of a planetary body as seen from an orbiting space vehicle.

FIGURE 1a illustrates the observed horizon line of FIGURE 1 in perspective view, and intersecting planes which are perpendicular to the local observed horizon portions, whereby their intersection forms the local vertical of the observing instrument.

FIGURE 2 schematically illustrates a mechanical arrangement of two-axis edge-sensors and the supports therefor for carrying out the operation illustrated in FIGURE 1a.

Figure 3:
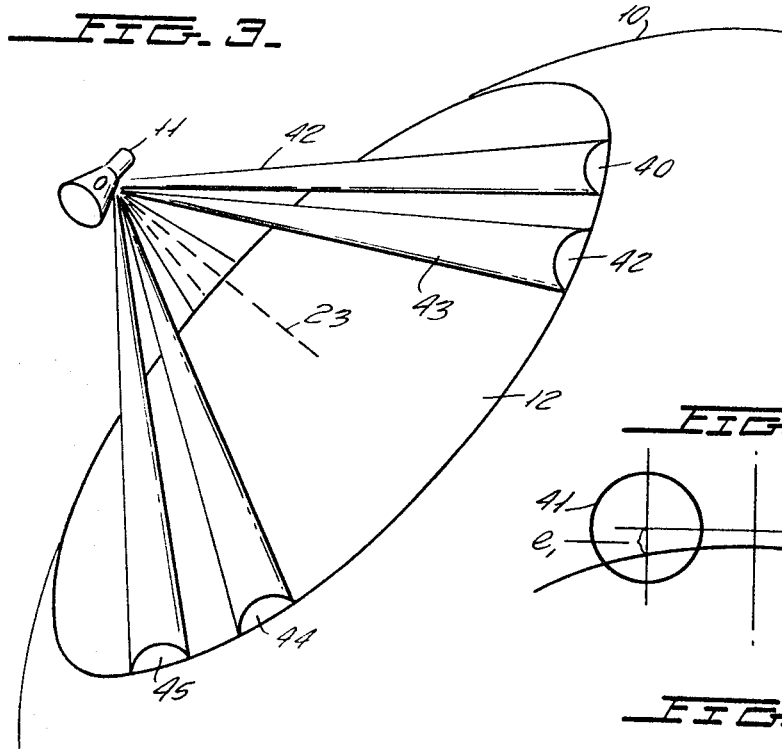

FIGURE 3 is similar to FIGURE 1a, and specifically illustrates the field of view of the scanners of the two-axis edge-sensors.

Figure 4A:
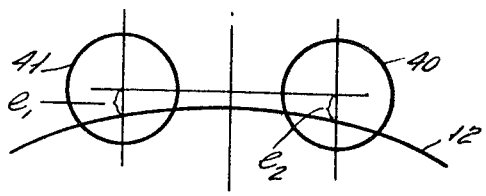

FIGURE 4a schematically illustrates the field of view of the individual scanners of one of the two-axis edge-sensors of FIGURE 3 with respect to the portion of the horizon observed by the device, and particularly illustrates the manner in which an elevation axis error signal is generated.

Figure 4B:
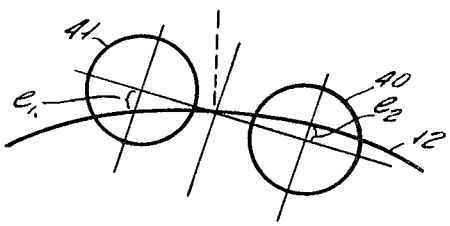

FIGURE 4b is similar to FIGURE 4a, and illustrates the generation of the cross-elevation axis error signal.

Figure 5:
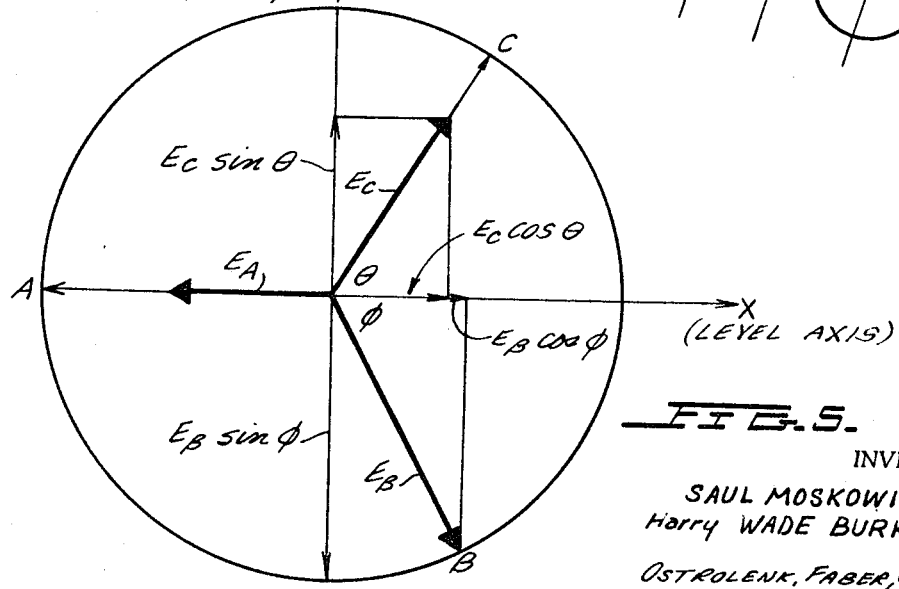

FIGURE 5 schematically illustrates the geometry of resolution of the cross-elevation axis error signals into Level and Cross-level servo drive signals.

FIGURE 6 is a schematic diagram of the electrical circuitry of the horizon seeker of the foregoing figures.

Referring first to FIGURE 1, we have illustrated therein a planetary body 10 which has a vehicle 11 which could be a manned or unmanned aircraft, an orbital vehicle, or space vehicle positioned with respect thereto. Vehicle 11 will observe a horizon line 12 which will be circular when seen from the vehicle 11. The horizon line 12 will not necessarily correspond directly to the actual horizon, as well known.

The horizon line 12 is shown in FIGURE 1a in perspective view, thus giving it an elliptical appearance. Referring now to FIGURE 1a, it is presumed that the vehicle 11 is at the location 13 and carries thereon three two-axis edge-sensor devices. These devices may be of any standard configuration well known to those skilled in the art, and are generally comprised of two conventional scanner devices capable of edge detection.

Of the three sensors, each has a respective line of sight to the horizon labeled A (L.O.S.), B (L.O.S.) and C (L.O.S.) for three devices, A, B, and C respectively. Since the line-of-sight view for any of instruments A, B, and C is taken by a two-axis edge-scanner, it is then possible to erect a plane from the space vehicle to the point on the horizon of observation which will be perpendicular to the local point of observation. Thus, sensor A permits erection of the plane labeled plane A, which includes dotted lines 20, 21, 22 (on the surface of the body), and the local vertical 23 of the vehicle 13. In a similar manner, the two-axis edge-sensor B permits erection of plane B which includes dotted lines 24, 25, 26 (on the body being observed), and the local vertical 23. Thus, the intersection of planes A and B permit the erection of local vertical line 23 which is the parameter which is to be measured.

In order to increase the accuracy of the device and to provide redundancy, the third two-axis edge-sensor C provides a still further plane C which will also include the local vertical 23.

It will be noted that any desired number of sensor devices could be utilized where two sensor units form a minimum constraint system. The particular embodiment illustrated in FIGURE 1a having three sensor devices will have one degree of added redundancy. Clearly, any number of degrees of added redundancy would come within the scope of the invention.

The manner in which the arrangement of FIGURE 1a may be mechanically carried out is illustrated in perspective view in FIGURE 2. Referring now to FIGURE 2, we have illustrated therein a portion of the vehicle frame 30 which pivotally receives a level gimbal 31 which, in turn, pivotally receives a cross-level gimbal plate 32. The cross-level gimbal plate then is provided with elevation gimbals 33, 34 and 35[1] which pivotally mount the two-axis edge-sensor devices A, B, and C respectively. It will be noted that the instrument vertical is illustrated in FIGURE 2 as the line 23 to conform with FIGURE 1a.

The sensors A, B and C are shown as being equally spaced in their angular separation from one another. When three sensors are selected, this is a preferred arrangement, although not a critical one, and clearly, any other desired spacing with any desired number of sensors could be used so long as there are at least two.

Each of the individual two-axis edge-sensors are formed of two conventional edge-scanners such as the individual edge-scanning portions 35 and 36 of two-axis edge-sensor A. Generally, the optical axis of each of the conventional scanners 35 and 36 are at some small fixed angle with respect to one another. Their optical axes lie in the plane of the sensors' elevation axis with the sensors' cross-elevational axis being perpendicular to this plane.

The field of view of this type sensor configuration is illustrated in FIGURE 3 wherein the horizon 12 of body 10 has a first portion 40 viewed by the scanner of one sensor, such as scanner 35 of sensor A of FIGURE 2, and a second portion 41 viewed by the other scanner 36 of the sensor. Note that the lines of view 42 and 43 of the scanners 35 and 36 of FIGURE 2 slightly diverge, but are in the plane of the elevation axis of sensor A.

In a similar manner, the sensor B having two scanners will view areas 44 and 45 respectively of horizon 12. The third sensor will behave in a similar manner on another portion of the horizon.

The manner in which sensor error signals are generated is best understood by reference to FIGURES 4a and 4b. Thus, FIGURE 4a, schematically illustrates the fields of view 40 and 41 of the scanners 35 and 36 respectively of sensor A with respect to the horizon portion 12. The manner in which scanners 35 and 36 generate output signals related to the horizon position is similar to that described, for example, in copending application Ser. No. 158,427, now Patent No. 3,240,941, filed Dec. 11, 1961, in the name of Jacob S. Zuckerbraun, and assigned to the assignee of the present invention. In the view shown in FIGURE 4a, the center of fields of view 40 and 41 are above horizon 12 whereupon scanners 35 and 36 will generate error signals $e_1$ and $e_2$ in the usual manner. The two signals $e_1$ and $e_2$ may be summed and used for control of the elevation axis servo drive, which will cause the sensor to rotate in its respective elevation gimbal to reduce the error to zero.

In the event that there is a cross-elevation axis error, as illustrated in FIGURE 4b, where the field of view 41 of scanner 36 is above horizon 12 while field of view 40 is below axis 12, or there is, in general, a difference in the outputs $e_1$ and $e_2$, a signal which is equal to $e_1$ minus $e_2$ is applied to the cross-elevation axis servo which is connected to gimbal plate 32 and will move gimbal plate 32 in the direction to correct this error.

From the foregoing, it will be clear that each of the sensors will operate to eliminate its respective elevation axis error signal and the cross-elevation axis signal whereby the axis of gimbal plate 32 will be coincident with local instrument vertical axis 23. Note that this is obtained without additional complex computer circuitry, or the like, which has been previously required in vertical axis locating equipment.

It is necessary that the cross-level error signals of the individual signals be transformed into the proper control axes. FIGURE 5 illustrates the geometry of the resolution of the cross-elevation axis error signals into level and cross-level servo drive signals. Clearly, where a different number of sensors are utilized, the diagram of FIGURE 5 would be appropriately changed.

Assuming first that $e_A$, $e_B$ and $e_C$ designate the cross-elevation axis error signal of sensors A, B, and C respectively (that is, each of $e_A$, $e_B$ and $e_C$ are equal to $e_1-e_2$ of their respective sensors A, B and C), then the level axis drive signal $e_x$ will be given by $$e_x = -e_A + e_B \cos \phi + e_C \cos \theta \qquad (1)$$

and the cross-level axis drive signal $e_y$, by $$e_y = e_C \sin \theta - e_B \sin \phi \qquad (2)$$

The manner in which these signals may be utilized is indicated in FIGURE 6 which shows an electrical schematic diagram of the complete horizon scanning system. Thus, in FIGURE 6, the sensors A, B, and C are schematically illustrated as being provided with appropriate respective servo drive systems for adjusting the elevation axis which includes appropriate servomotors 50, 51 and 52 and servo amplifiers 53, 54 and 55 respectively, whereby the total output signals of the two scanners of each of the devices causes the sensor to be moved in elevation until the output signal is zero.

The cross-elevation axis error signal is then taken from each of sensors A, B, and C and applied to an appropriate scaling and summing network 56 which determines $e_x$ of Equation 1 and applies this signal to a servo system having amplifier 57 and servo motor 58. Motor 58 is connected to the level gimbal 31 to control the position of the level gimbal with respect to the vehicle frame in accordance with the signal from network 56.

In a similar manner, the outputs of only two of the sensors B and C are connected to a scaling and summation network 59, as required by Equation 2 noted above to control the position of cross-level gimbal plate 32 through the servo amplifier 60 and servomotor 61 connected to gimbal plate 32.

It will be noted that the system of FIGURE 6 is merely a mechanization of Equations 1 and 2 given above, and is simple in nature and may be made to a high degree of reliability.

Although this invention has been described with respect to its preferred embodiments, it should be understood that many variations and modifications will now be obvious to those skilled in the art, and it is preferred therefore that the scope of this invention be limited not by the specific disclosure herein, but only by the appended claims.

The embodiments of the invention in which an exclusive privilege or property is claimed are defined as follows:

1. A horizon tracker comprising at least first and second two-axis edge-sensors mounted on a common platform; each of said first and second two-axis edge-sensors having first and second respective horizon scanners disposed at a small angle with respect to one another for observing a small horizon segment; said first and second two-axis edge-sensors having a common elevation plane; said first and second two-axis edge-sensors being disposed at an angle to one another to observe different portions of a horizon.

2. A horizon tracker comprising at least first and second two-axis edge-sensors mounted on a common platform; each of said first and second two-axis edge-sensors having first and second respective horizon scanners disposed at a small angle with respect to one another for observing a small horizon segment; said first and second two-axis edge-sensors having a common elevation plane; said first and second two-axis edge-sensors being disposed at an angle to one another to observe different portions of a horizon; adjustable mounting means connecting each of said first and second two-axis edge-sensors to said common platform; each of said edge-sensors generating output signals related to the position of a horizon with respect to each of said edge-sensors; and servo means connected to said adjustable mounting means and to said output signals; each of said first and second two-axis edge-sensors being adjustable in their said elevation plane responsive to their respective total output signal from their respective scanners and being adjustable in their cross-elevation plane responsive to the respective differences in output signals from their respective scanners.

3. The device substantially as set forth in claim 1 wherein said common platform is secured to a level gimbal and said level gimbal is mounted on a vehicle; each of said two-axis edge-sensors being gimbal mounted on said common platform.

4. The device substantially as set forth in claim 2 wherein said common platform is secured to a level gimbal and said level gimbal is mounted on a vehicle; each of said two-axis edge-sensors being gimbal mounted on said common platform.

5. A horizon tracker comprising at least first and second two-axis edge-sensors mounted on a common platform; each of said first and second two-axis edge-sensors having first and second respective horizon scanners disposed at a small angle with respect to one another for observing a small horizon segment; said first and second two-axis edge-sensors having a common elevation plane; said first and second two-axis edge-sensors being disposed at an angle to one another to observe different portions of a horizon; adjustable mounting means connecting each of said first and second two-axis edge-sensors to said common platform; each of said edge-sensors generating output signals related to the position of a horizon with respect to each of said edge-sensors; and servo means connected to said adjustable mounting means and to said output signals; each of said first and second two-axis edge-sensors being adjustable in their said elevation plane responsive to their respective total output signal from their respective scanners and being adjustable in their cross-elevation plane responsive to the difference in output signals from their respective scanners; said first and second two-axis edge-sensors being gimbal mounted to said common platform.

6. A horizon tracker comprising at least first and second two-axis edge-sensors mounted on a common platform; each of said first and second two-axis edge-sensors having first and second respective horizon scanners disposed at a small angle with respect to one another for observing a small horizon segment; said first and second two-axis edge-sensors having a common elevation plane; said first and second two-axis edge-sensors being disposed at an angle to one another to observe different portions of a horizon, and a third two-axis edge-sensor mounted on said common platform and having an elevation plane common to the elevation plane of said first and second two-axis edge-sensors; said third two-axis edge-sensor adding one degree of redundancy to said horizon tracker.

7. A horizon tracker comprising at least first and second two-axis edge-sensors mounted on a common platform; each of said first and second two-axis edge-sensors having first and second respective horizon scanners disposed at a small angle with respect to one another for observing a small horizon segment; said first and second two-axis edge-sensors having a common elevation plane; said first and second two-axis edge-sensors being disposed at an angle to one another to observe different portions of a horizon; adjustable mounting means connecting each of said first and second two-axis edge-sensors to said common platform; each of said edge-sensors generating output signals related to the position of a horizon with respect to each of said edge-sensors; and servo means connected to said adjustable mounting means and to said output signals; each of said first and second two-axis edge-sensors being adjustable in their said elevation plane responsive to their respective total output signal from their respective scanners and being adjustable in their cross-elevation plane responsive to the difference in output signals from their respective scanners, and a third two-axis edge-sensor mounted on said common platform and having an elevation plane common to the elevation plane of said first and second two-axis edge-sensors; said third two-axis edge-sensor adding one degree of redundancy to said horizon tracker.

8. The device substantially as set forth in claim 7 wherein said common platform is secured to a level gimbal and said level gimbal is mounted on a vehicle; each of said two-axis edge-sensors being gimbal mounted on said common platform.

9. The device substantially as set forth in claim 8 wherein said platform and said level gimbal is connected to a respective position controlling servo system; the cross-elevation-axis-error signal of each of said sensors being applied to the servo system of said level gimbal; the cross-elevation-axis-error signal of only said first and second sensors being connected to said platform.

References Cited
UNITED STATES PATENTS

| | | | |
|---|---|---|---|
| 2,877,354 | 3/1959 | Fairbanks et al. | 250—203 |
| 2,963,242 | 12/1960 | Mueller | 250—203 X |
| 2,963,243 | 12/1960 | Rothe | 250—203 |
| 3,020,407 | 2/1962 | Merlen | 244—14 |
| 3,090,583 | 5/1963 | Behun et al. | 250—83.3 |

WALTER STOLWEIN, *Primary Examiner.*

U.S. Cl. X.R.
88—1; 244—3.21